(12) United States Patent
Takenaka et al.

(10) Patent No.: US 7,904,200 B2
(45) Date of Patent: Mar. 8, 2011

(54) LEG TYPE MOBILE ROBOT

(75) Inventors: Toru Takenaka, Saitama (JP); Keizo Matsumoto, Saitama (JP); Hiroshi Gomi, Saitama (JP); Kazushi Hamaya, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1194 days.

(21) Appl. No.: 10/573,471

(22) PCT Filed: Jul. 25, 2005

(86) PCT No.: PCT/JP2005/013575
§ 371 (c)(1),
(2), (4) Date: Mar. 24, 2006

(87) PCT Pub. No.: WO2006/027902
PCT Pub. Date: Mar. 16, 2006

(65) Prior Publication Data
US 2008/0245584 A1 Oct. 9, 2008

(30) Foreign Application Priority Data
Sep. 3, 2004 (JP) .................. 2004-257697

(51) Int. Cl.
*B62D 57/32* (2006.01)
(52) U.S. Cl. ............... 700/245; 180/8.1; 180/8.6; 901/1; 901/46; 318/568.12; 318/568.2
(58) Field of Classification Search ............... 700/245, 700/246, 251, 253, 260, 261; 318/568.1, 318/568.12, 568.16, 568.17, 568.2; 901/1, 9, 41, 46; 701/23; 320/116, 120; 180/8.1, 8.6
See application file for complete search history.

(56) References Cited

U.S. PATENT DOCUMENTS

| | | | | |
|---|---|---|---|---|
| 5,455,497 | A * | 10/1995 | Hirose et al. | 318/568.12 |
| 5,808,433 | A * | 9/1998 | Tagami et al. | 318/568.12 |
| 5,838,130 | A * | 11/1998 | Ozawa | 318/568.2 |
| 6,243,623 | B1 * | 6/2001 | Takenaka et al. | 700/245 |

(Continued)

FOREIGN PATENT DOCUMENTS

JP 2003-071776 3/2003

(Continued)

OTHER PUBLICATIONS

Japanese Office Action with translated summary, Jan. 5, 2010.

*Primary Examiner* — Khoi Tran
*Assistant Examiner* — Nikhil Sriraman
(74) *Attorney, Agent, or Firm* — Squire, Sanders & Dempsey (US) LLP

(57) ABSTRACT

A leg type mobile robot, in which a downsizing and wait-saving of floor reaction force detector to be installed on the foot is enabled. The center Pb of the force sensor is disposed on the position Pa where the distance to the remotest position of ground area provided on the bottom of each plate spring part S1 to S4 is minimum in the standing-still state of the robot R, and the distance L1, L2, L3, and L4 to the remotest point of the ground area of each plate spring part S1, S2, S3, and S4 is equal. The center Pc of the ankle joint is offset in a rearward direction with respect to the position Pa in a plane view.

7 Claims, 9 Drawing Sheets

U.S. PATENT DOCUMENTS

| | | | |
|---|---|---|---|
| 6,920,374 B2 * | 7/2005 | Takenaka et al. | 700/245 |
| 6,992,455 B2 * | 1/2006 | Kato et al. | 318/568.12 |
| 7,119,510 B2 * | 10/2006 | Kawai | 318/568.12 |
| 7,240,747 B2 * | 7/2007 | Miyazaki et al. | 180/8.6 |
| 7,308,336 B2 * | 12/2007 | Takenaka et al. | 700/245 |
| 7,319,917 B2 * | 1/2008 | Takenaka et al. | 700/245 |
| 7,319,918 B2 * | 1/2008 | Takenaka et al. | 700/245 |
| 7,319,919 B2 * | 1/2008 | Takenaka et al. | 700/245 |
| 7,337,039 B2 * | 2/2008 | Takenaka et al. | 700/245 |
| 7,337,040 B2 * | 2/2008 | Takenaka et al. | 700/245 |
| 7,379,789 B2 * | 5/2008 | Takenaka et al. | 700/245 |
| 7,487,011 B2 * | 2/2009 | Takenaka et al. | 700/253 |
| 7,493,192 B2 * | 2/2009 | Takenaka et al. | 700/260 |
| 7,496,428 B2 * | 2/2009 | Takenaka et al. | 700/245 |
| 7,498,758 B2 * | 3/2009 | Baba et al. | 318/568.12 |
| 2003/0125839 A1 * | 7/2003 | Takenaka et al. | 700/245 |
| 2005/0080511 A1 | 4/2005 | Takenaka et al. | |
| 2005/0088131 A1 | 4/2005 | Furuta et al. | |
| 2006/0106495 A1 * | 5/2006 | Takenaka et al. | 700/253 |
| 2008/0245584 A1 * | 10/2008 | Takenaka et al. | 180/8.1 |

FOREIGN PATENT DOCUMENTS

| | | |
|---|---|---|
| JP | 2003-205484 | 7/2003 |
| JP | 2006-062057 | 3/2006 |

* cited by examiner

LEG TYPE MOBILE ROBOT

FIELD OF THE INVENTION

The present invention relates to a leg type mobile robot.

BACKGROUND ART

For example, a technique described in Japanese examined patent publication JP2003-71776 has been known as a technique for a leg type mobile robot, particularly the structure of a foot of the leg type mobile robot. A foot of the leg type walking robot described in JP2003-71776 connects with an end of the leg through an ankle joint, and is composed by a force sensor (floor reaction force detector) for detecting floor reaction force, a spring mechanism provided with a elastic member having an impact absorbing function, a foot sole frame, a foot sole plate and a sole sequentially from above.

The center of the ankle joint is offset (bias) backward and inward to the bottom surface, i.e. ground area, to be grounded on a floor surface.

Then, the floor reaction force detector is disposed so that the center of the floor reaction force detector agrees with the center of the ankle joint in a plane view (here, the center of the floor reaction force detector agrees to a sensitivity center of the Z-axis), and detects a floor reaction force entered from the ground area using a spring mechanism.

Thus, the influence of the impact at the time of landing is reduced using the spring mechanism object, while raising the detection accuracy of the floor reaction force by providing the floor reaction force detector to the foot near the ground area.

However, the leg type walking robot described in JP2003-71776 requires to enhance the speed (walk and run) of the travel. When the leg type walking robot moves at a high speed, large inertia force is generated on the leg. So as to reduce the inertia force, there is a desire to reduce the weight of the end side of the leg, that is, the weight of a foot. Especially, a downsizing and wait-saving of floor reaction force detector to be installed on the foot has been desired.

The present invention is made based on above described background, and aims to provide a leg type mobile robot, in which a downsizing and wait-saving of floor reaction force detector to be installed on the foot is enabled.

The leg type mobile robot of the present invention includes an body, legs each connected to the body via a first joint; and foots each connected to an end part of the leg via a second joint, wherein the foot includes at least one foot portion, which has a ground area to be grounded on a floor surface at the bottom thereof, and a floor reaction force detector for detecting floor reaction force acting from a floor surface through the foot portion, and wherein the center Pc of the second joint is offset against the position Pa in a plane view, the position Pa is the position where the distance to the remotest point of at least one ground area becomes minimum, and the center Pb of the floor reaction force detector is provided so that the center Pb is in the vicinity of the position Pa than the center Pc of the ankle joint in a plane view.

The position Pa can be put into the center of the circumscribed circle of minimum size of at least one of the ground area. According to this construction, the amplitude of the floor reaction force to be entered to the floor reaction force detector can be minimized that the case where the position of the center Pb of the floor reaction force detector is located at the same position as the center Pc of the second joint in a plane view.

BENEFIT OF THE INVENTION

According to the present invention, a downsizing and wait-saving of floor reaction force detector installed on the foot is enabled, and the leg type mobile robot suitable for a high speed traveling can be provided.

DESCRIPTION OF THE PREFERRED EMBODIMENTS

Figure 1:
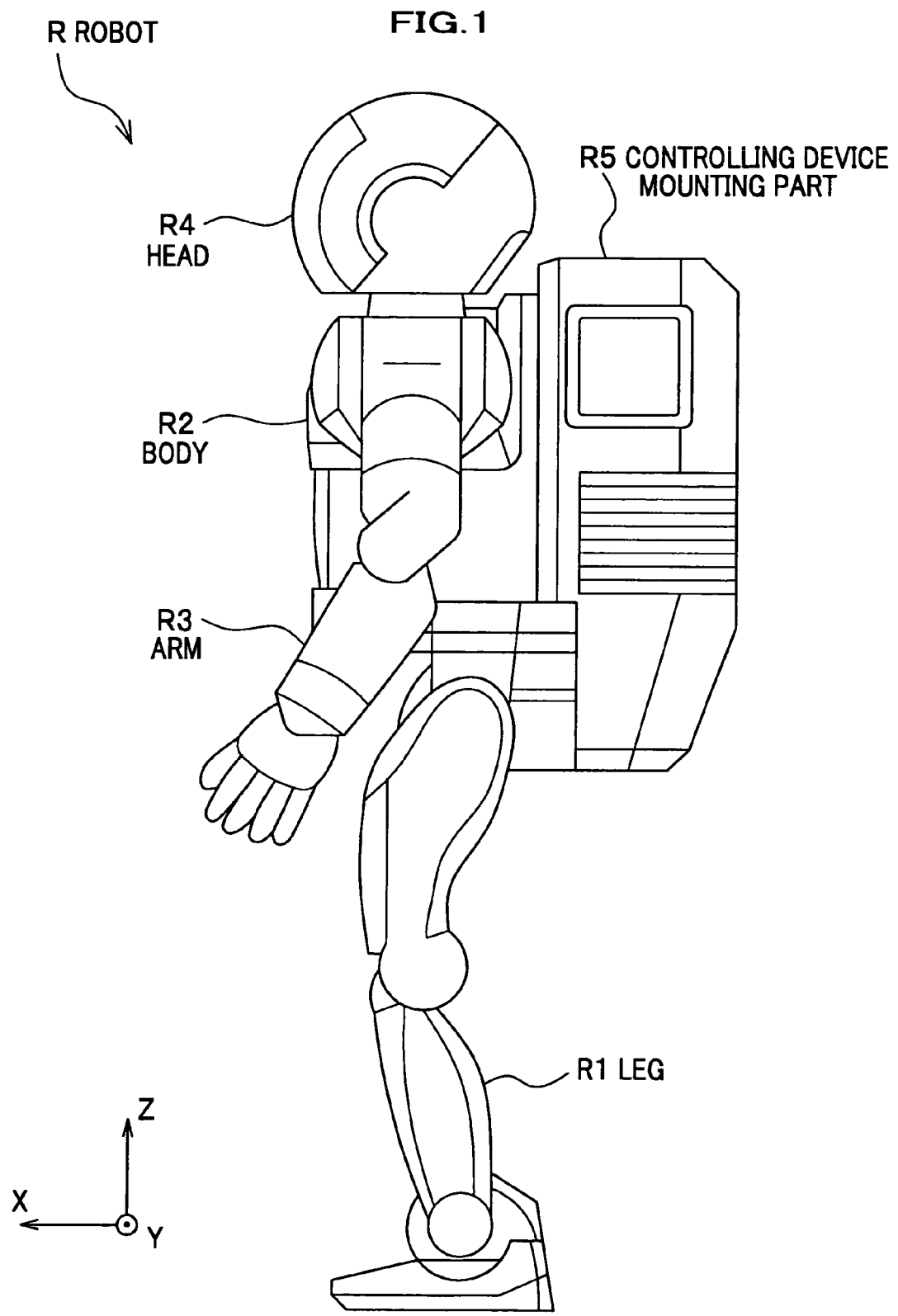
FIG. 1 is a side view showing a two-feet mobile robot according to the present invention.

Hereinafter, the embodiment of the present invention will be described in detail with reference to the drawings by using a case where the construction of the leg type mobile robot of the present invention is applied to an autonomously movable two-feet mobile robot as an example. Identical components are designated by the same reference numerals, and the overlapping description is omitted. The forward-and-backward direction, lateral direction and vertical direction of the two-feet mobile robot are respectively set to the X-axis, the Y-axis and the Z-axis, respectively. Expressions for the position and direction or the like of the two-feet mobile robot are described on the basis of a state where the two-feet mobile robot takes a standing posture.

<Two-Feet Mobile Robot R>

First, the two-feet mobile robot of the present invention is described with reference to FIG. 1. FIG. 1 is a side view showing a two-feet mobile robot according to the present invention.

As shown in FIG. 1, a two-feet mobile robot (hereinafter referred simply to as "robot") R stands and moves (walks and runs or the like) using two legs R1 (only one leg is shown) in the same manner as a human. The two-feet mobile robot has an body R2, two arms R3 (only one arm is shown) and a head R4, and is an autonomously mobile robot. The robot R is provided with controlling device mounting part R5 for controlling the operation of the legs R1, the body R2, the arms R3 and the head R4 so that the controlling device mounting part R5 is abutted against the back (behind the body R2).

<Joint Structure of Leg Part R1>

Figure 2:
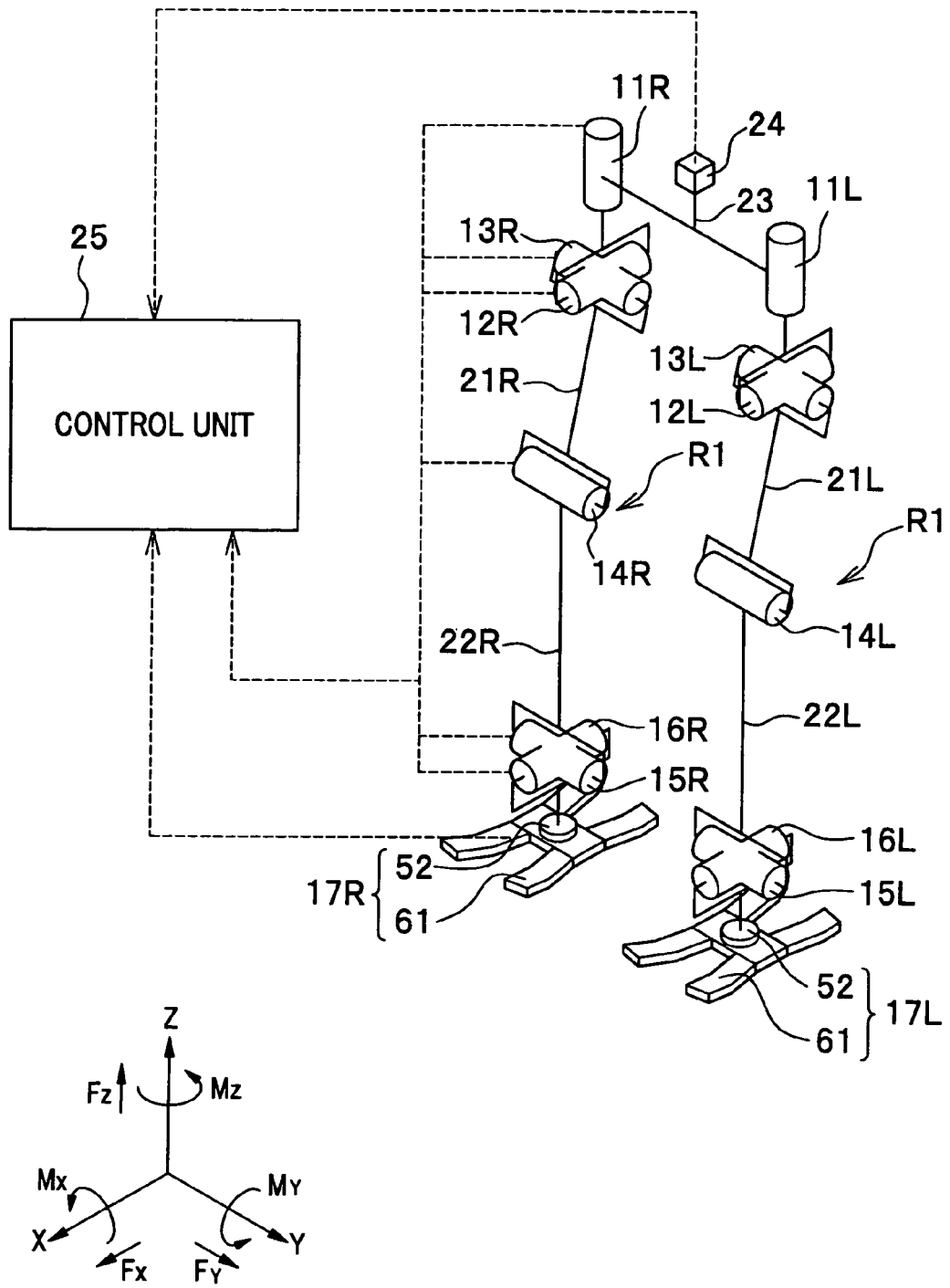
FIG. 2 is a schematic view showing the joint structure of a leg shown in FIG. 1.

Next, the joint structure of the leg R1 of the robot R is described with reference to FIG. 2. FIG. 2 is a schematic view showing the joint structure of a leg shown in FIG. 1. As shown in FIG. 2, the robot R is provided with the right and left legs R1 having six joints 11R(L) to 16R(L) respectively. The right and left twelve joints are composed by hip joints 11R and 11L (the right side is set to R and the left side is set to L, and so on) for rotating the legs (around the Z-axis) provided at a hip part, hip joints 12R and 12L around a roll axis (X-axis) of the hip part, hip joints 13R and 13L around a pitch axis (Y-axis) of the hip part, knee joints 14R and 14L around a pitch axis (Y-axis) of a knee part, ankle joints 15R and 15L around a pitch axis (Y-axis) of an ankle, and ankle joints 16R and 16L around a roll axis (X-axis) of the ankle. Feet parts 17R and 17L are attached to the lower part of the leg R1.

That is, the leg R1 is provided with the hip joints 11R(L), 12R(L) and 13R(L), the knee joint 14R(L) and the ankle joints 15R (L) and 16R(L). The hip joints 11R(L) to 13R(L) and the knee joint 14R(L) are connected by thigh links 21R, 21L, and the knee joint 14R(L) and the ankle joint 15R(L) and 16R(L) are connected by the shank links 22R and 22L. The hip joints 11R(L) to 13R(L) are an example of the "first joint", and the ankle joints 15R(L) and 16R(L) are an example of the "second joint".

The leg R1 is connected to the body R2 via the hip joints 11R(L) to 13R(L). FIG. 2 shows a connection part of the leg R1 and the body R2 as an body link 23 simply. An inclination sensor 24 is installed on the body R2, and detects the inclination and angular velocity to the direction of the Z-axis (perpendicular axis) of the body R2. A rotary encoder (not shown) for detecting the amount of rotation is provided on an electric motor for driving each joint.

When this construction is employed, a total of twelve freedom degrees can be transmitted to the right and left feet of the leg R1. A desired movement can be transmitted to the whole leg (the leg R1 and foot 17) by driving the twelve (6×2) joints at a proper angle during walking, and the robot can walk in three-dimensional space arbitrarily (herein, "x" means multiplication).

As shown in FIG. 2, a known force sensor 52 is provided below the ankle joints 15R(L) and 16R(L). The force sensor 52 detects the three direction ingredients Fx, Fy and Fz of the floor reaction force acting on the robot R from the floor surface, and the three direction ingredients Mx, My and Mz of the moment among the external force acting on the robot R. A signal with respect to the floor reaction force, moment, inclination and angular velocity or the like detected by the force sensor 52 and the inclination sensor 24 or the like is transmitted to a control unit 25 provided in the control device mounting part R5, and is used for controlling the posture and operation or the like of the robot R. The control unit 25 calculates a joint drive control value based on data stored in a memory (not shown) and the inputted detection signal, and drives the joint.

<Foot Part 17 of Robot R>

The foot 17R(L) of the robot R is attached to the end part (floor surface side) of the leg R1 via the ankle joints 15R(L) and 16R(L), and is provided with the force sensor 52 and a foot plate member 61. Since the left leg (the left leg R1 and the foot 17L) and the right leg (the right leg R1 and the foot 17R) are symmetrical, R and L are removed when there is no necessity, as hereinafter described.

Embodiment

Figure 3:
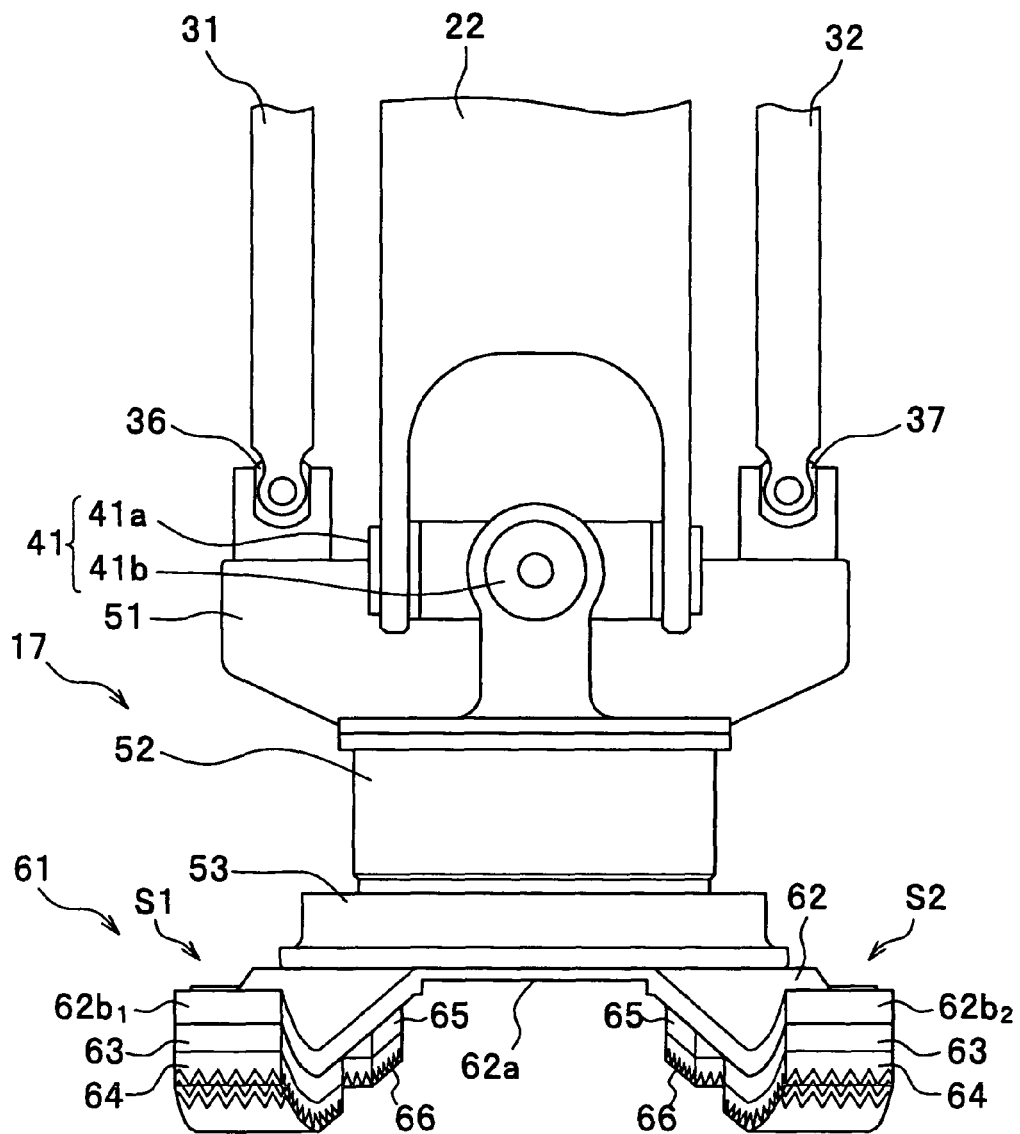
FIG. 3 is a front view showing a foot of the two-feet mobile robot according to the embodiment of the present invention.
Figure 4:
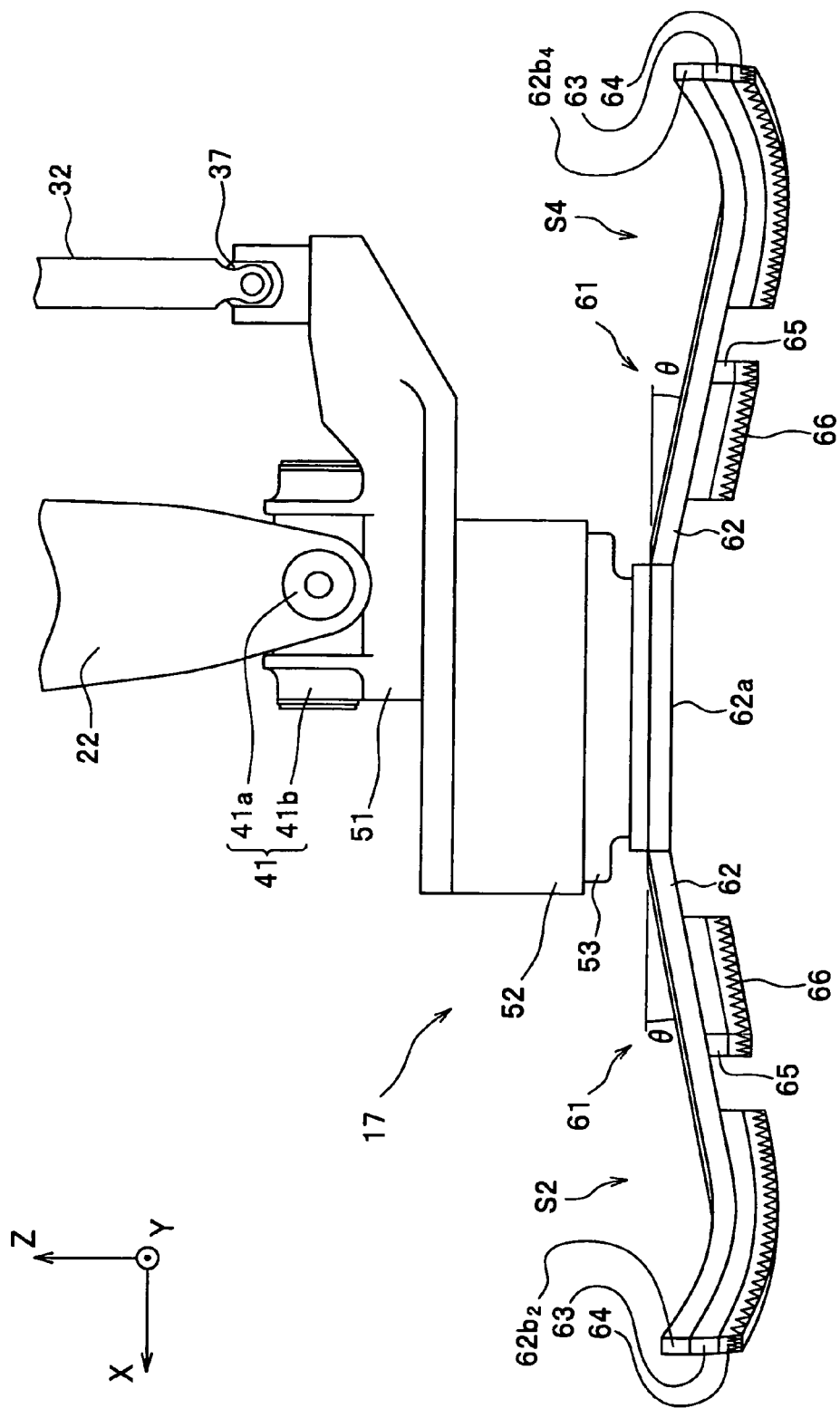
FIG. 4 is a side view showing a foot of the two-feet mobile robot according to the embodiment of the present invention.
Figure 5:
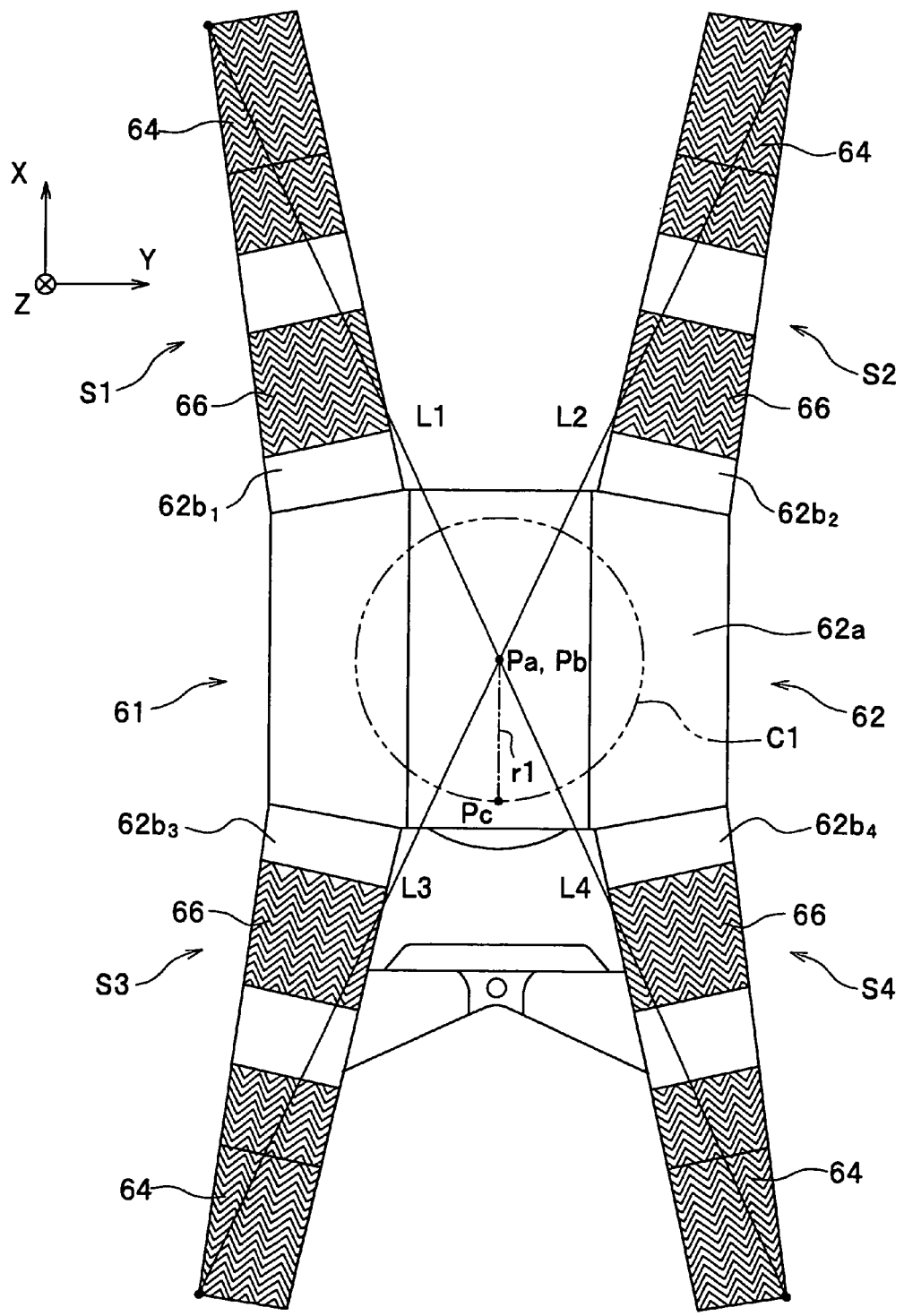
FIG. 5 is a bottom view showing a foot of a two-feet mobile robot according to the embodiment of the present invention.

First, the foot 17 of the robot R according to the first embodiment of the present invention is described with reference to FIG. 3 to FIG. 5. FIG. 3 is a front view showing a foot of the two-feet mobile robot according to the first embodiment of the present invention. FIG. 4 is a side view showing the foot of the two-feet mobile robot according to the first embodiment of the present invention. FIG. 5 is a bottom view showing a foot of a two-feet mobile robot according to the first embodiment of the present invention. The leg R1 and the foot 17 shown in FIG. 3 to FIG. 5 are shown in a state where an armoring part of the robot R shown in FIG. 1 are suitably removed. The left leg of the robot R (the left leg R1 and the foot 17L) is shown in FIG. 3 to FIG. 5.

<<Ankle Joint of Robot R>>

Herein, with reference to FIG. 3 and FIG. 4, the ankle joints 15 and 16 of the robot R are simply described. The ankle joints 15 and 16 of the robot R are composed by connecting a cross shaft 41 to the shank link 22 and a first base seat part 51 of the foot 17.

The cross shaft 41 is obtained by combining an axis 41a using a Y-axis as a rotational axis and an axis 41b using an X-axis as the rotational axis in a cross shape. The both end parts of the axis 41a are rotatably supported by the shank link 22. The both end parts of the axis 41b are rotatably supported by the first base seat part 51. That is, the axis 41a corresponds to the ankle joint 15, and the axis 41b corresponds to the ankle joint 16.

A first rod 31 and a second rod 32 are provided in the oblique rear of the shank link 22. The first rod 31 is provided in the right oblique rear of the shank link 22, and is connected to the first base seat part 51 via the cross shaft 36. The second rod 32 is provided in the left oblique rear of the shank link 22, and is connected to the first base seat part 51 via the cross shaft 37. The first rod 31 and the second rod 32 are advanced and retreated up and down by transmitting the driving force generated by the rotation of an electric motor provided above the first rod 31 and the second rod 32 (for example, the shank link 22 and the thigh link 21 or the like) via a reduction gear. Thereby, the first rod 31 and the second rod 32 move the ankle joints 15 and 16, and maintain the ankle joints 15 and 16 at a predetermined angle.

For example, the first rod 31 and the second rod 32 are advanced downward when the tiptoe part of the foot 17 is to be raised, and the first rod 31 and the second rod 32 are retreated upward when the heel part of the foot 17 is raised. The rod of the side to be left is retreated upward and the rod of the other side is advanced downward when either of the right and left of the foot 17 is raised from the floor surface. The operation of the first rod 31 and second rod 32 is controlled by the control unit 25.

<<Foot Part 17 of Robot R>>

As shown in FIG. 3 to FIG. 5, the foot 17 of the robot R is provided with the first base seat part 51, the force sensor 52, the second base seat part 53 and the foot flat member 61 sequentially from above (ankle joint side).

The first base seat part 51 is provided on the upper part of the foot 17, and is connected to the ankle joints 15 and 16.

As described above, the force sensor 52 detects the translation force of the floor reaction force of three directions, and the moment of the floor reaction force of three directions. Each part is stored in the case (unitized). In the embodiment, the first base seat part 51 and the force sensor 52 are fixed by a plurality of bolts (not shown). The output of the force sensor 52 is inputted into the control unit 25 via a harness. The force sensor 52 is an example of a "floor reaction force detector."

The second base seat part 53 is provided below the force sensor, i.e., between the force sensor 52 and the foot flat member 61, and fixes the force sensor 52 and the foot flat member 61 to each other. In the embodiment, the force sensor 52 and the second base seat part 53 are fixed by a plurality of bolts (not shown), and the second base seat part 53 and the foot flat member 61 are fixed by a plurality of bolts (not shown). Thus, since the force sensor 52 and the foot flat member 61 are fixed via the second base seat part 53, the structure of the foot 17 can be simplified and the weight of the foot 17 can be reduced. The assembling structure of each member of the foot 17 is not limited to the above structure.

The foot flat member 61 is a member attached to the lower part of the second base seat part 53, and constitutes the main part of the foot portion grounded on the floor face. The foot flat member 61 is an example of the "foot portion".

The foot flat member 61 is provided with a plate spring body 62, a first intermediate member 63, a first sole member 64, a second intermediate member 65 and a second sole member 66.

The plate spring body 62 is a part supporting the empty weight of the robot R while bending, and is mainly composed by a base part 62a and a spring part 62b extending from the base part 62a. In the embodiment, the plate spring body 62 is integrally formed in the shape where the base end part of the spring part 62b is connected to the base part 62a.

The base part 62a has a flat plate shape, and has a shape along the bottom surface of the second base seat part 53. The base end part of the spring part 62b to be described later is connected to the base 62a, and the spring part 62b functions as a plate spring using the connection part with the base 62a as the base end part.

The spring part 62b extends downward at an angle θ (see FIG. 4) from the end part of the base part 62a. In the embodiment, four spring parts 62b1, 62b2, 62b3, and 62b4 are used. The spring parts 62b1 and 62b2 extend forward (the tiptoe direction) from the base part 62a, and the spring parts 62b3 and 62b4 extend backward (the heel direction) from the base part 62a. It is preferable that the spring parts 62b1, 62b2, 62b3 and 62b4 have the same shape, the same intensity and the same performance (elastic modulus).

It is preferable that the angle θ is set to the minimum angle where the base part 62a is not grounded on the floor surface when the maximum floor reaction force Fz acts. Herein, for example, the maximum floor reaction force Fz means a reaction force acting when the robot R runs at top speed and one leg is grounded on the floor surface. The empty weight of the robot R is supported by the elastic force of the spring part 62b (62b1 to 62b4) by the set. In addition, the set can prevent the base part 62a from being grounded on the floor surface, and the adverse influence to the force sensor 52 can be prevented.

The plate spring body 62 is required only to be a material capable of making the spring part 62b function as a plate spring, and may be made of a metal member (steel, aluminium alloy and magnesium alloy or the like). Particularly, when the plate spring body 62 is made of a composite member (fiber reinforced plastic or the like) reinforced with fiber, the weight of the plate spring body 62 can be reduced while desired intensity and rigidity are acquired. In this case, the intensity of the spring part 62b can be secured by coinciding the fiber direction of the fiber for reinforcing with the direction (longitudinal direction) to the tip part from the base end part of the spring part 62b.

Anisotropy can be transmitted by changing the fiber direction of each spring part 62b, and the spring characteristics of each spring part 62b can also be changed.

A carbon fiber, a glass fiber, an organic fiber, a metal fiber or the like are preferable as the fiber for reinforcing. It is preferable that the plate spring body 62 is a member integrally formed. The number of components can be further reduced and the structure of the foot can be simplified by integrally forming the plate spring body 62 having a construction in which a plurality of spring parts 62b (four pieces in the embodiment) are attached to one base 62a.

The first intermediate member 63 is an attenuating member attached to a part corresponding to the bottom surface or ground area of the spring part 62b, i.e., the side of the lower end part (the same as the side of the tip part in the embodiment). The first intermediate member 63 has a function for attenuating the vibration of the spring part 62b generated at the time of being grounded. It is preferable that the intermediate member 63 is made of a material provided with an attenuation function. For example, it is preferable that the intermediate member 63 is made of a foaming resin or the like. A damper device using liquid pressure or the like may be installed as the attenuation means instead of the first intermediate member 63. The damper device can be used in combination with the first intermediate member 63.

The first sole member 64 is attached to the bottom surface of the first intermediate member 63, and is located at the lower end part of the foot flat member 61. The first sole member 64 is actually grounded on the floor surface at the time of moving. The first sole member 64 fulfills a non-slip function owing to resistance generated between the first sole member 64 and the floor surface. It is preferable that the first sole member 64 is made of a material having the non-slip function. For example, the first sole member made of rubber is preferable. The bottom surface of the first sole member 64 is the "ground area".

The second intermediate member 65 is an attenuating material attached to the intermediate part of the bottom surface of the spring part 62b. The second intermediate member 66 has a function for attenuating the vibration of the spring part 62b generated when the second sole member 66 to be described is grounded. It is preferable that the second intermediate member 65 is made of a material having the attenuation function in the same manner as the first intermediate member 63, for example, a member made of a foaming resin or the like.

The second sole member 66 is attached to the bottom surface of the second intermediate member 65. The second sole member 66 fulfills the a non-slip function owing to the frictional resistance generated between the first sole member 64 and the floor surface in the same manner as the above first sole member 64. The second sole member 66 is located above the first sole member 64.

In the embodiment, four plate spring parts S1, S2, S3, and S4 are respectively composed by the spring part 62b. In detail, the spring part S1 is composed by the spring part 62b1, and the plate spring part S2 is composed by the spring part 62b2. The plate spring part S3 is composed by the spring part 62b3, and the plate spring part S4 is composed by the spring part 62b4. When the first sole member 64 provided at the tip of each of the plate spring parts S1, S2, S3, and S4 is grounded, the plate spring parts S1, S2, S3, and S4 elastically deform, and the empty weight of the robot R, more particularly, the whole load due to the structure above the spring part 62b of the robot R is supported by the plate spring parts S1, S2, S3, and S4 elastically deformed. Therefore, in spite of the simple construction, the empty weight of the robot R can be supported, and further the shock due to the floor reaction force can be absorbed. The moving (walking and running) speed of the robot R can be enhanced by enhancing impact absorptivity.

The elastic member or the like becomes unnecessary, and the weight of the foot 17 can be reduced. Since the inertia force to the leg R1 is reduced by the reduction of the weight, the leg R1 has a structure suitable for high-speed movement.

The plate spring parts S1, S2, S3, S4 and the base part 62a are arranged in a nearly letter H-shape in a plane view. When this construction is employed, two ground areas are respectively arranged at the front and back sides, and the spring characteristics of the plate spring parts S1, S2, S3 and S4 arranged so as to extend in the forward-and-backward direction respectively are suitable for load control in the forward-and-backward direction. Thereby, the foot flat structure is suitable for the control of the two-feet movement, and the control for planting its feet using the front and back ground areas and moving the load center of the robot R in the forward-and-backward direction. Since the plate spring parts S1 and S2 and the plate spring parts S3 and S4 are provided so as to slightly opened toward the tip part, the robot R plants its feet effectively even when the robot R is inclined to right and left and the load is shifted in the right-and-left direction.

When the shape of the floor surface has unevenness, either of the plate spring parts S1 to S4 may be raised from the floor surface (is not grounded). In such a case, the bending spring characteristics (roll rigidity and pitch rigidity) of the plate spring parts S1 to S4 are nonlinearly changed. Therefore, the control unit 25 corrects a target foot flat position posture so that all the plate spring parts S1 to S4 are grounded and bent based on the signal from the force sensor 52. The control unit 25 controls so that the robot R takes a posture for generating target floor reaction force. The amount of correction of the target foot flat position posture is calculated by a nonlinear operation according to the left condition of the plate spring part estimated from the detection value of the force sensor 52.

Here, with reference to FIG. 5, the relationship between the position Pa wherein the distance to the remotest point of each ground area is minimum, the center Pb of the force sensor, and the center Pc of the ankle joint will be described.

In this embodiment, the force sensor is provided so that the center Pb of the force sensor (in case of FIG. 5, Pb agrees with the sensitivity center of the Z-axial direction of force sensor 52) is positioned above the position Pa wherein the distance to the remotest point of each ground areas is minimum. To be more precise, the force sensor is provided so that the center Pb of the force sensor is positioned above the position Pa (occasionally referred to as the center of the ground area, and hereinafter simply described as "position Pa") wherein the distance to the remotest point of each grounding areas, which are provided at the bottom surface sides of the plate spring parts S1 to S4, is minimum in the standing-still state of the robot R. In this embodiment, the distance L1, L2, L3, and L4 to the remotest point of the ground area of each plate spring part S1, S2, S3, and S4 is equal. According to this construction, the maximum value of load acting on the force sensor 52 at the time of traveling can be suppressed, and the size of the force sensor 52 can be minimized. Additionally, since the force sensor 52 is provided in the vicinity of the ground area of the foot 17, the floor reaction force and the moment can be more exactly measured.

When the ground areas are arranged so as to form an equilateral polygon, the force sensor 52 is arranged so that the distances between each ground area and the force sensor 52 become equal. The floor reaction force detector for detecting at least one axial floor reaction force or moment (for example, the translation force Fz of the floor reaction force in the Z-axial direction) may be used instead of the force sensor 52.

In this embodiment, the center Pc of the ankle joint is offset to the position Pa in a plane view. Herein, the intersection of the axis 41a and axis 41b (see FIG. 3) corresponds to the center Pc of the ankle joint. The center Pc of the ankle joint is provided behind the robot R from the position Pa. Thus, the reason why the ankle joints 15 and 16 are offset backward to the ground area of the foot flat member 61 will be described later.

Also, the center Pc of the ankle joint may be further offset to inside the ground area of the foot flat member 61 (the center side of the robot R). The interference of foot flat members 61 of the adjoining feet 17R and 17L can be prevented by offsetting the center Pc of the ankle joint inside, and the stability of the posture of the robot R can be maintained by securing the ground area.

In this embodiment, although the center Pb of the force sensor is provided on the position Pa, the center Pb of force sensor may be provided so that at least the center Pb becomes closer to the position Pa from the center Pc of the ankle joint in a plane view. In other words, the center Pb of the force sensor should be located within a circle C1 in which the position Pa is set to the center in a plane view, and which makes a radius the line segment r1 connecting a position Pa and the center Pc of an ankle joint. For example, the center Pb of the force sensor may be located on the line segment r1. This construction can also suppress the maximum value of the load acting on the force sensor 52 at the time of moving, and miniaturize the force sensor 52. Particularly, when the center Pb of force sensor is located on the position Pa, the effect for the miniaturization of the force sensor 52 can be maximally achieved.

As shown in FIG. 4, the lower end parts (tip part) of the plate spring parts S1 to S4 are curved upward as the lower end parts separate from the ankle joints 15 and 16, and the first sole member 64 provided on the bottom surface also has the same shape. This is the reason why the robot R is controlled to walk so that the robot R is grounded from the heel part and the floor surface is kicked by the tiptoe part, therefore, the area grounded at the time of being grounded and kicking is enlarged, thereby making it possible to secure the frictional force between the floor surface and the foot. Since the ground area can be secured by the surface, the posture of the robot R is also stabilized.

Figure 6A:
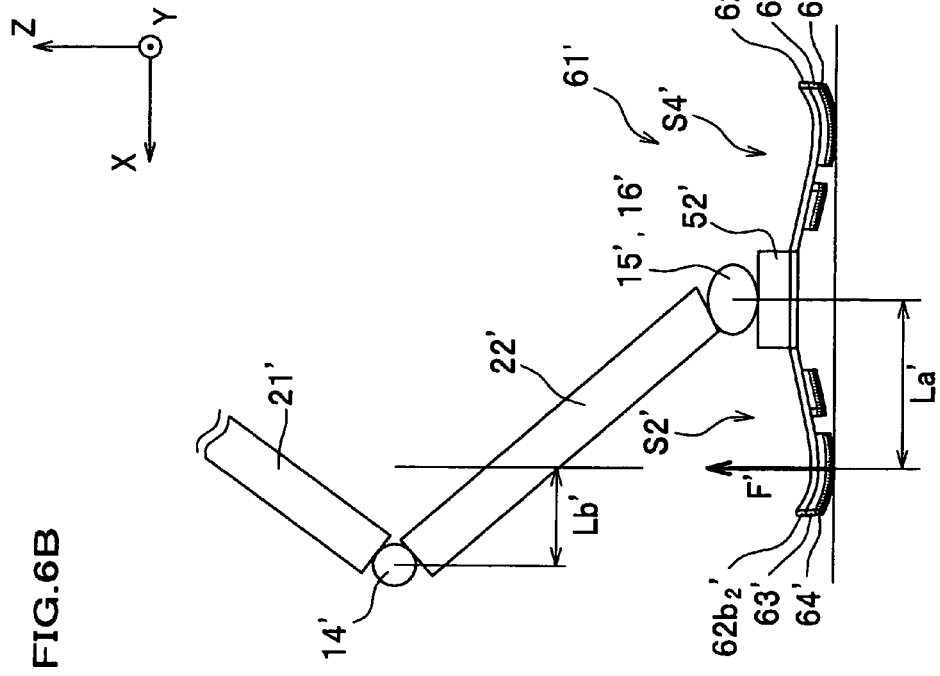
FIG. 6 is a schematic view for explaining the case where the two-feet mobile robot according to the embodiment of the present invention moves at high speed.
Figure 6B:
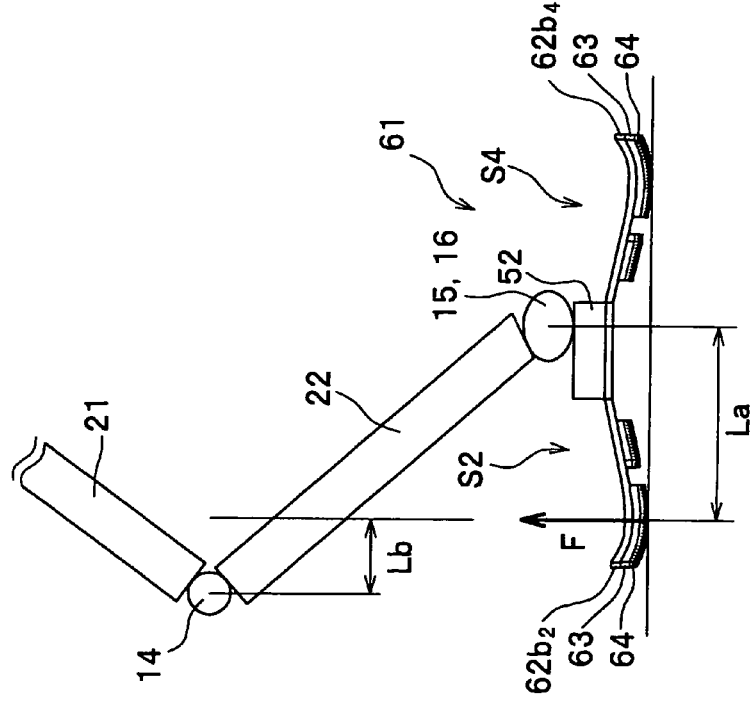

Next, the reason why the ankle joints 15 and 16 are offset to the rear of the ground area of the foot flat member 61 is described by using the case where the robot R moves at high speed (run) as an example. FIG. 6 is a schematic view for explaining the case where the two-feet mobile robot according to the first embodiment moves at high speed. FIG. 6($a$) shows the case where the ankle joint is offset backward to the foot portion, and FIG. 6($b$) shows the case where the ankle joint is located at the center of the forward-and-backward direction of the foot portion. The numerals to which "'" is added are used for the same parts as FIG. 6($a$) in FIG. 6($b$).

Figure 9:
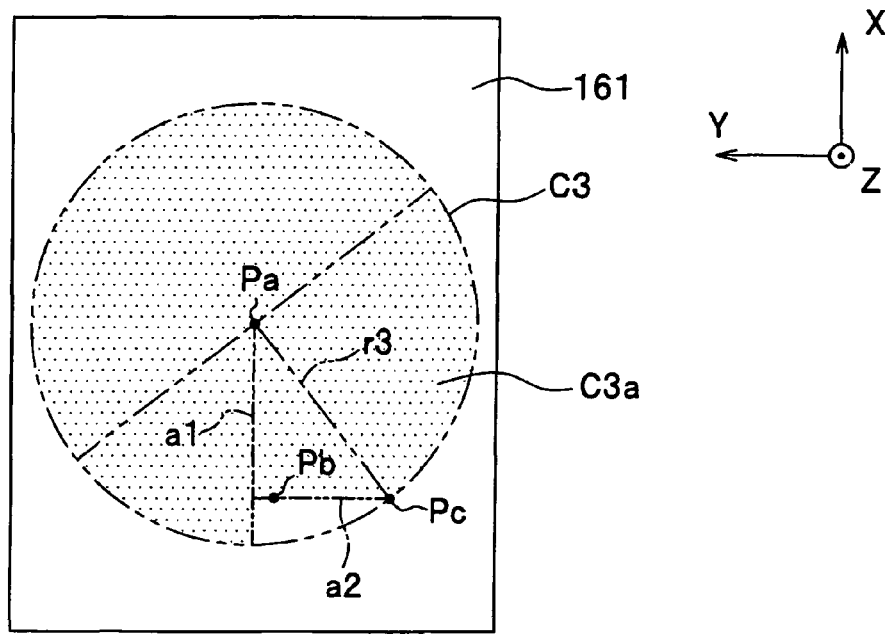
FIG. 9 is a plane view schematically showing the positional relationship between a ground area, ankle joint, and force sensor of a two-feet mobile robot according to another embodiment of the present invention.

As shown in FIG. 6($a$), the ankle joints 15 and 16 are offset backward to the foot flat member 61 (bias). In this case, the distance La from the ankle joints 15 and 16 to the front tip of the ground part of the foot flat member 61 becomes longer (La>La'). When the robot R moves at high speed (run), the knee joint 14 is deeply bent, and thereby the state where the floor reaction force F concentrates on the tiptoe part of the foot flat member 61 is generated. At this time, the moment generated on the knee joint 14 becomes F×Lb. On the other hand, as shown in FIG. 9($b$), the moment generated on the knee joint 14' becomes F'×Lb' when the ankle joints 15' and 16' are located at the center of the forward-and-backward direction of the foot flat member 61'. Herein, since Lb is smaller than Lb', F×Lb<F'×L'×b' is satisfied when F is equal to F'.

This is satisfied when the ankle joints 15 and 16 are offset, with respect to the foot-flat-member 61, in the opposite direction (back in this embodiment) against the relative-movingdirection (front in this embodiment) of the knee joint 14 to the foot flat member 61. This means that the burden to the knee joint 14 at the time of high-speed movement can be suppressed into a small value, when the amount of the backward offset with respect to the foot flat member 61 of the ankle joints 15 and 16 is enlarged.

<Modification Example>

Next, the modification example of the positional relationship between the ground area of foot portion, center of the ankle joint, center of force sensor of the robot will be explained focusing on difference between the above-described embodiment and the present embodiment (modification example).

Figure 7:
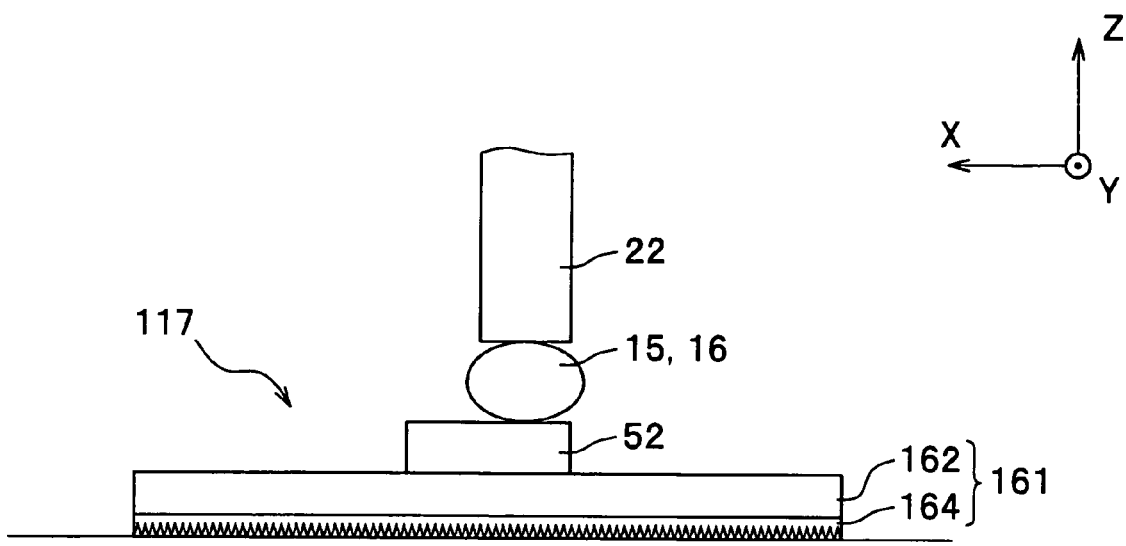
FIG. 7 is a side view schematically showing a foot and ankle joint of a two-feet mobile robot according to another embodiment of the present invention.

FIG. 7 is a side view schematically showing a foot and ankle joint of a two-feet mobile robot according to another embodiment. Each of FIG. 8 to FIG. 11 is a plane view schematically showing the positional relationship between a ground area, an ankle joint, and force sensor of a two-feet mobile robot according to another embodiment.

As shown in FIG. 7, a foot 117 of modification example equips foot flat member 16 instead of foot flat member 61.

As shown in FIG. 7, the foot flat member 161 includes a foot main portion 162, which is a flat-shaped rigid member, and a sole member 164, which is provided on the bottom of the foot main portion 162 and is made of rubber etc.

Figure 8:
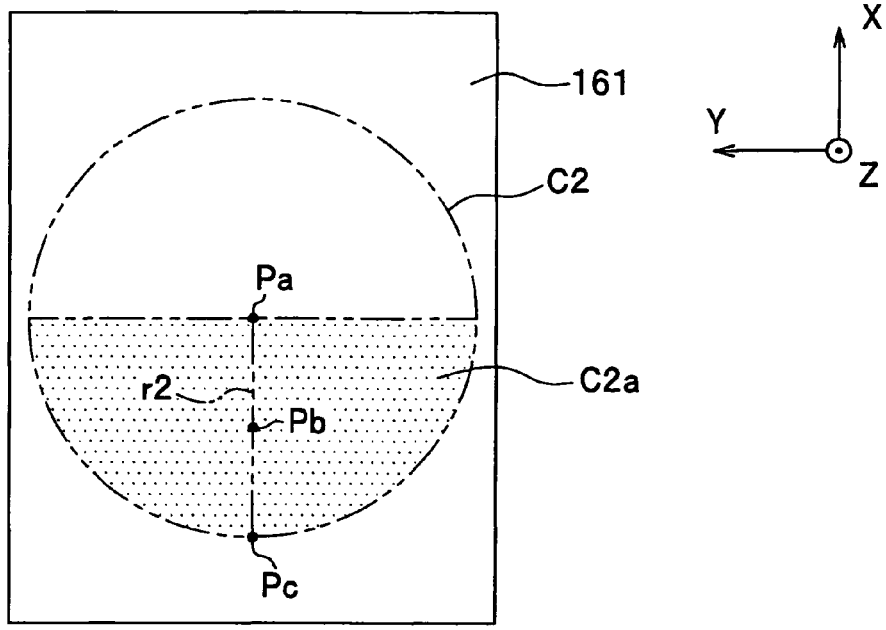
FIG. 8 is a plane view schematically showing the positional relationship between a ground area, ankle joint, and force sensor of a two-feet mobile robot according to another embodiment of the present invention.

The shape of the ground area is almost the same shape as the bottom of the foot main portion 162, and has a rectangular shape directing X-axis thereof in a longitudinal direction (see FIG. 8). That is, one grounding area is provided on the foot flat member 161. The force sensor 52 is provided on the foot flat member 161 and detects a floor reaction force entered from the foot flat member 161.

Here, like a leg type walking robot of JP2003-71776, the spring mechanism (elastic member etc.) may be provided between the foot flat member 161 and the force sensor 52. The ankle joint 15, 16 is provided above the force sensor 52.

FIG. 8 shows the example that the center Pc of the ankle joint is offset backward with respect to the position Pa where the distance to the remotest point of the ground area is small (in this embodiment, the number of the ground area is one).

In this state, the center Pb of the force sensor is located on the line segment r2 connecting the position Pa and the center Pc of the ankle joint in a plane view.

Here, the position of the center Pb of force sensor is not limited to the above described embodiment, any modification may be acceptable as long as the center Pb is within (excepting the circumference) the circle C2a, whose radius is the line segment r2 and whose center is the position Pa in a plane view. Additionally, it is still more preferable that the center Pb is within (including a diameter portion but excepting a circular arc portion) semicircle C2a in which the center Pc of the ankle joint is set to the center. Furthermore, it is still more preferable that the position of the center Pb is in the vicinity of the line segment r2 among the semicircle C2a. Still furthermore, it is preferable that the center Pb of force sensor is on the line segment r2 (exepting the center Pc of the ankle joint) and that the center Pb of force sensor is in the vicinity of the position Pa among the line segment r2.

Figure 10:
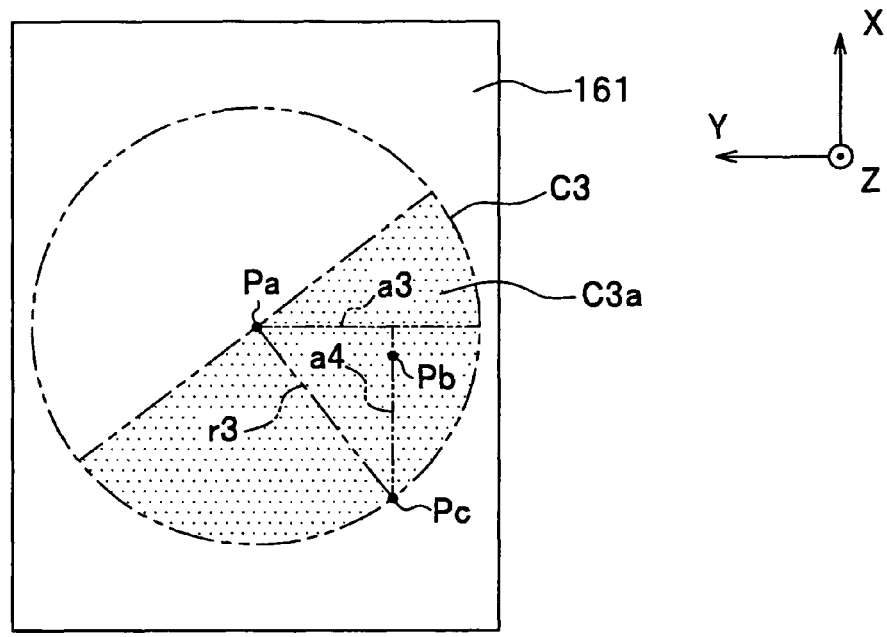
FIG. 10 is a plane view schematically showing the positional relationship between a ground area, ankle joint, and force sensor of a two-feet mobile robot according to another embodiment of the present invention.
Figure 11:
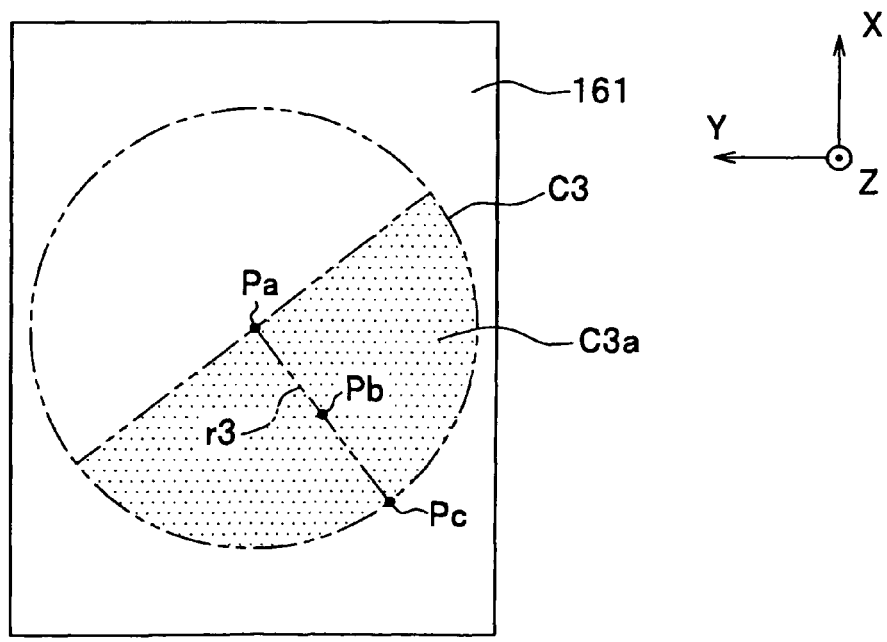
FIG. 11 is a plane view schematically showing the positional relationship between a ground area, ankle joint, and force sensor of a two-feet mobile robot according to another embodiment of the present invention.

FIG. 9 through FIG. 11 show the example that the center Pc of the ankle joint is offset in a backward and inward direction with respect to the position Pa.

The modification example of FIG. 9 is the case where the center Pb of the force sensor is approached to the position Pa by shifting only in Y-axis direction (in a direction left-and-right of the robot R). The center Pb of force sensor is located on the perpendicular a2 (except for the center Pc of an ankle joint) taken down from the center Pc of the ankle joint to the line segment a1 extended from the position Pa to backward direction (the X-axis minus direction).

The modification example of FIG. 10 is the case where the center Pb of the force sensor is approached to the position Pa by shifting only in X-axis direction (in a fore-and-rear of the robot R). The center Pb of the force sensor is located on the perpendicular a4 (except for the center Pc of the ankle joint) taken down from the center Pc of the ankle joint to the line segment a3 extended from the position Pa to inward direction (the Y-axis minus direction).

The modification example shown in FIG. 11 is the cases where the center Pb of the force sensor is approached to the position Pa by shifting in X-axis and Y-axis direction. Especially in the FIG. 11, the case where the center Pb of the force sensor is located, in a plane view, on the line segment r3 (except for the center Pc of the ankle joint) connecting the position Pa and the center Pc of the ankle joint is indicated.

Here, the position of the center Pb of force sensor is not limited to the above described embodiment, any modification may be acceptable as long as the center Pb is within (excepting the circumference) the circle C3, whose radius is the line segment r3 and whose center s the position Pa in a plane view. Additionally, it is still more desirable that the center Pb is within (including a diameter portion but excepting a circular arc portion) semicircle C3a in which the center Pc of the ankle joint is set to the center. Furthermore, it is still more preferable that the position of the center Pb is in the vicinity of the line segment r3 among the semicircle C3a. Still furthermore, it is preferable that the center Pb of force sensor is on the line segment r3 (exepting the center Pc of the ankle joint) and that the center Pb of force sensor is in the vicinity of the position Pa among the line segment r3.

In the above described modification example, any modification of the direction and distance of offset (bias) with regard to the position Pa of the center Pb of the force sensor may be acceptable as long as the center Pb is within the circle C2, C3 (except for the circumference of the circle) in a plane view. But, it is preferable that the center Pb of the force sensor is within the ground area of the foot flat member 161 in a plane view.

As described above, although the embodiments of the present invention were described, the present invention is not limited to the embodiments, and design variations can be suitably performed without departing from the spirit of the present invention. For example, the robot R is not limited to the two-feet mobile robot shown. The robot R may be the leg type mobile robot provided with only the one leg or the leg type mobile robot provided with the legs of 3 or more.

Additionally, the material, shape, and function etc., of the foot portion (foot flat member) are not limited to those of the above described embodiment, and the floor reaction force detector is not limited to the force sensor 52. That is, the present invention can be applied for the leg type mobile robot in which the floor reaction force detector is disposed between the second joint (ankle joint) and the foot portion (foot flat member) having a ground area. Furthermore, the number, shape, and location etc., of the ground are is not limited to the above described embodiment.

The invention claimed is:

1. A leg type mobile robot comprising:
   a body;
   legs each connected to the body via a first joint; and
   feet, each connected to an end part of the leg via a second joint, wherein each foot includes
   at least one foot portion, which has at least two ground areas to be grounded on a floor surface at a bottom thereof, and a floor reaction force detector configured to detect a floor reaction force acting from the floor surface through at least one of the two ground areas the foot portion, and wherein in a footprint view from overhead, when the robot is in a standing-still state, a center of the second joint is offset against a position, the position is of equal distance to a point on each ground area, wherein the point on each ground area is most remote on the ground area from the position, and a center of the floor reaction force detector is closer to the position than to the center of the second joint.

2. A leg type mobile robot according to claim 1, wherein the center of the floor reaction force detector is offset to a rear direction with respect to the position.

3. A leg type mobile robot according to claim 2, wherein the center of the floor reaction force detector is positioned on a line segment connecting the position and the center of the second joint.

4. A leg type mobile robot according to claim 1, wherein the center of the floor reaction force detector is offset to a rear direction in a center side of the leg type mobile robot with respect to the position.

5. A leg type mobile robot according to claim 4, wherein the center of the floor reaction force detector is located on the perpendicular taken down from the center of the second joint to the line segment extended from the position to a rear direction.

6. A leg type mobile robot according to claim 4, wherein the center of the floor reaction force detector is located on the perpendicular taken down from the center of the second joint to the line segment extended from the position to a center of the leg type mobile robot.

7. A leg type mobile robot according to claim 4, wherein the center of the floor reaction force detector is positioned on a line segment connecting the position and the center of the second joint.

* * * * *